(12) United States Patent
Shaw

(10) Patent No.: US 10,143,123 B2
(45) Date of Patent: Dec. 4, 2018

(54) CORE COLLECTOR

(71) Applicant: John L. Shaw, South Park, PA (US)

(72) Inventor: John L. Shaw, South Park, PA (US)

(73) Assignee: John L. Shaw, South Park, PA (US)

( * ) Notice: Subject to any disclaimer, the term of this patent is extended or adjusted under 35 U.S.C. 154(b) by 0 days.

(21) Appl. No.: 15/411,444

(22) Filed: Jan. 20, 2017

(65) Prior Publication Data

US 2017/0208731 A1  Jul. 27, 2017

Related U.S. Application Data

(60) Provisional application No. 62/281,353, filed on Jan. 21, 2016.

(51) Int. Cl.
*A01B 45/02* (2006.01)

(52) U.S. Cl.
CPC .................. *A01B 45/02* (2013.01)

(58) Field of Classification Search
CPC ........ A01B 45/00; A01B 45/02; A01B 45/023
See application file for complete search history.

(56) References Cited

U.S. PATENT DOCUMENTS

| | | | | |
|---|---|---|---|---|
| 976,811 A * | 11/1910 | Kloss | ..................... | A01B 43/00 171/105 |
| 3,429,378 A * | 2/1969 | Mascaro | .............. | A01B 45/023 172/22 |
| 3,797,578 A * | 3/1974 | Velasquez | .............. | A01B 45/02 172/22 |
| 4,148,362 A * | 4/1979 | Orth | ...................... | A01B 45/02 111/89 |
| 4,712,623 A * | 12/1987 | Martinez | .................. | E02F 3/76 172/701.1 |
| 4,884,637 A * | 12/1989 | Rohleder | .............. | A01B 45/023 172/125 |
| 5,069,293 A * | 12/1991 | St. Romain | ............ | A01B 45/02 171/144 |
| 5,134,837 A * | 8/1992 | Casey | .................... | A01D 45/30 56/12.8 |
| 5,178,221 A * | 1/1993 | Hamawaki | ........... | A01B 45/023 172/22 |

(Continued)

FOREIGN PATENT DOCUMENTS

| FR | 2378439 A1 * | 8/1978 | ............. A01B 45/02 |
|---|---|---|---|
| GB | 2287167 A * | 9/1995 | ........... A01B 45/023 |
| WO | WO-2010033583 A2 * | 3/2010 | ........... A01B 45/023 |

*Primary Examiner* — Jamie L McGowan
(74) *Attorney, Agent, or Firm* — The Webb Law Firm

(57) ABSTRACT

A core collector for collecting aeration cores lifted from a ground surface by a ground aerator machine includes a skid plate having a bottom surface opposite the ground surface and a top surface opposite the bottom surface. The skid plate has a plurality of openings in the skid plate extending between the top surface and the bottom surface at a proximal end of the skid plate. The plurality of openings are spaced apart from each other based on a spacing of extraction tines of the ground aerator machine. The core collector has at least one core clearing member. Aeration cores are deposited directly onto the top surface of the skid plate. The at least one core clearing member is configured to clear the aeration cores from the proximal end of the skid plate toward the distal end of the skid plate.

15 Claims, 6 Drawing Sheets

(56) References Cited

U.S. PATENT DOCUMENTS

| | | | | |
|---|---|---|---|---|
| 5,423,386 A * | 6/1995 | Lapearous | ............ | A01B 45/02 172/22 |
| 5,816,336 A * | 10/1998 | Underhill | ............... | A01B 45/02 172/22 |
| 5,983,560 A * | 11/1999 | Hartmeister | ............. | A01G 1/12 47/9 |
| 6,142,239 A * | 11/2000 | Underhill | ............ | A01B 45/023 172/118 |
| 6,142,240 A * | 11/2000 | Underhill | ............ | A01B 45/023 172/22 |
| 6,805,205 B1 * | 10/2004 | Gabard | ................. | A01B 45/02 172/21 |
| 6,986,393 B1 * | 1/2006 | Johnston, Jr. | ........... | A01B 45/02 172/21 |
| 2003/0155139 A1 * | 8/2003 | Pfisterer | ................ | A01B 45/00 172/554 |
| 2008/0295366 A1 * | 12/2008 | Keane | ................... | A01B 31/00 37/403 |
| 2011/0162855 A1 * | 7/2011 | Vincel | ................. | A01B 45/023 172/1 |
| 2011/0213530 A1 * | 9/2011 | Hunt | ................... | A01B 45/023 701/50 |
| 2013/0075117 A1 * | 3/2013 | Hall | .................... | A01B 45/023 172/22 |
| 2015/0216101 A1 * | 8/2015 | Zabel | .................. | A01B 45/023 172/22 |
| 2015/0216102 A1 * | 8/2015 | Georgoulias | ......... | A01B 45/023 172/22 |

* cited by examiner

CORE COLLECTOR

CROSS-REFERENCE TO RELATED APPLICATIONS

This application claims the benefit of U.S. Provisional Application No. 62/281,353, entitled "Core Collector" and filed on Jan. 21, 2016, the disclosure of which is incorporated by reference herein in its entirety.

BACKGROUND OF THE INVENTION

Field of the Invention

The present invention relates generally to ground aeration, and, more particularly, to an improved core collector for use with a ground aerator to collect cores pulled from the ground.

Description of Related Art

Ground aeration is an important practice for maintaining the health of lawns, golf course greens and fairways, and/or athletic fields. Over time and with use, the soil tends to compact, making it difficult for the grass to grow due to lower oxygen levels and decreased water and nutrient movement in the soil. As compaction increases, less oxygen can enter the soil and less carbon dioxide can escape. The net result is gradually thinning grass until, ultimately, the soil can no longer support any grass growth.

One type of ground aeration is core aeration, where a series of small aeration cores or plugs of soil are removed from the ground, leaving a hole in the ground. The plurality of holes open passageways in the soil, allowing air, water, and nutrient movement. The cores are typically removed using a ground aerator machine. In general, the ground aerator machine removes a plurality of cylindrical plugs using a series of mechanical extractors, such as metal tines. The tines are typically mounted on a rotating arm driven by a crank shaft of a motor. Each tine digs into the ground and removes a core from below the surface of the ground. In some existing applications, the ground aerator may remove about 10-120 cores per square foot, with a typical core depth of about 1.5-5 inches. The extracted cores are typically discharged directly on the ground behind the ground aerator machine.

Ground aeration with such conventional ground aerator machines is often inefficient. Typically, the extracted cores are swept by hand and hauled away. Such sweeping and hauling is time consuming and costly. In cases where the extracted cores are collected by a machine, the core collection device typically has a box with a trap door that dumps the cores as the tines are rotated out of the ground. However, during use, the cores are dragged across the ground surface, smearing debris on the ground and the core collection device. In many cases, the debris from the extracted cores can completely or partially plug the freshly made holes. The result is unwanted leftover discharge and debris from the extracted cores dispersed onto the ground surface. Consequently, this presents a need for a prevention of the cores (and/or portions of plugs) from at least partially filling the fresh holes. What is needed is a core collector device for use with a ground aerator machine that easily collects the extracted cores and reduces the manual labor and expense associated with conventional ground aeration techniques.

SUMMARY OF THE INVENTION

Generally, provided is an improved core collector for use with a ground aerator machine that overcomes the deficiencies associated with the conventional ground aeration techniques.

In one preferred and non-limiting embodiment or aspect, provided is a core collector for use with a ground aeration machine to collect one or more cores pulled from the ground by the ground aeration machine by depositing the cores directly onto the core collector instead of scooping the extracted cores from the ground surface.

In another preferred and non-limiting embodiment or aspect, a core collector for collecting aeration cores lifted from a ground surface by a ground aerator machine may include a skid plate having a bottom surface opposite the ground surface and a top surface opposite the bottom surface. The skid plate may be configured for connecting to the ground aerator machine. The skid plate may have a plurality of openings in the skid plate extending between the top surface and the bottom surface at a proximal end of the skid plate. The plurality of openings may be spaced apart from each other based on a spacing of extraction tines of the ground aerator machine. The core collector may have at least one core clearing member mounted on the core collector. Aeration cores that are extracted from the ground surface may be deposited directly onto the top surface of the skid plate. The at least one core clearing member may be configured to clear the aeration cores from the proximal end of the skid plate toward the distal end of the skid plate.

In another preferred and non-limiting embodiment or aspect, the core collector may include a housing connected to the skid plate. The housing may have an enclosure that at least partially encloses the skid plate. The enclosure may have one or more vent openings. A linkage mechanism may be provided for raising or lowering the housing relative to the skid plate. The linkage mechanism may be configured for connecting to the ground aerator machine. The at least one core clearing member may be a blower or a pair of blowers provided on opposite sides of the skid plate. The core collector may have one or more pipes having a first end connected to the blower and a second end positioned over at least one of the plurality of openings. The one or more pipes may be configured to direct forced air from the at least one core clearing member to blow the aeration cores that are extracted from the ground surface from the proximal end of the skid plate toward the distal end of the skid plate. The skid plate may directly contact the ground surface. The skid plate may be flat or have an angled portion at the proximal end. The skid plate may be made from a plastic material, metal, or a combination thereof.

In another preferred and non-limiting embodiment or aspect, a ground aerator machine for extracting aeration cores from a ground surface may have a frame movably supported on two or more wheels, a motor supported on the frame, a coring drive mechanism operatively connected to the motor, a plurality of extraction tines reciprocally driven by the coring drive mechanism into and out of the ground surface, and a core collector connected to the frame. The core collector may have a skid plate having a bottom surface configured to contact the ground surface and a top surface opposite the bottom surface, and a plurality of openings in the skid plate extending between the top surface and the bottom surface at a proximal end of the skid plate. The plurality of openings may be spaced apart from each other based on a spacing of extraction tines. The aeration cores extracted from the ground surface may be deposited directly onto the top surface of the skid plate. At least one core clearing member may be mounted on at least one of the frame and the core collector. The at least one core clearing member may be configured to clear the aeration cores from the proximal end of the skid plate toward a distal end of the skid plate. A housing may be connected to the skid plate. The housing may have an enclosure that at least partially encloses the skid plate. The coring drive mechanism may be operatively connected to the motor by a driveshaft or a belt.

Further preferred and non-limiting embodiments or aspects will now be described in the following numbered clauses.

Clause 1. A core collector for collecting aeration cores lifted from a ground surface by a ground aerator machine, the core collector comprising:
a skid plate having a bottom surface opposite the ground surface and a top surface opposite the bottom surface;
a plurality of openings in the skid plate extending between the top surface and the bottom surface at a proximal end of the skid plate; and
at least one core clearing member mounted on the core collector,
wherein the aeration cores that are extracted from the ground surface are deposited directly onto the top surface at the proximal end of the skid plate, and
wherein the at least one core clearing member is configured to clear the aeration cores from the proximal end of the skid plate toward a distal end of the skid plate.

Clause 2. The core collector of clause 1, further comprising a housing engaged with the skid plate.

Clause 3. The core collector of clause 2, wherein the housing comprises an enclosure that at least partially encloses the skid plate.

Clause 4. The core collector of clause 3, wherein the enclosure has one or more vent openings.

Clause 5. The core collector of any of clauses 1-4, further comprising a linkage mechanism for raising or lowering the housing relative to the skid plate.

Clause 6. The core collector of clause 5, wherein the linkage mechanism is configured for connecting the core collector to the ground aerator machine.

Clause 7. The core collector of any of clauses 1-6, wherein the at least one core clearing member is a blower.

Clause 8. The core collector of any of clauses 1-6, wherein the at least one core clearing member is a pair of blowers provided on opposite sides of the skid plate.

Clause 9. The core collector of any of clauses 1-8, further comprising one or more pipes having a first end connected to the at least one core clearing member and a second end positioned over at least one of the plurality of openings.

Clause 10. The core collector of clause 9, wherein the one or more pipes is configured to direct forced air from the at least one core clearing member to blow the aeration cores that are lifted from the ground from the proximal end of the skid plate toward the distal end of the skid plate.

Clause 11. The core collector of any of clauses 1-10, wherein the skid plate directly contacts the ground surface.

Clause 12. The core collector of any of clauses 1-11, wherein the plurality of openings are spaced apart from each other based on a spacing of extraction tines of the ground aerator machine.

Clause 13. The core collector of any of clauses 1-12, wherein the skid plate has an angled portion at the proximal end.

Clause 14. The core collector of any of clauses 1-13, wherein the skid plate is made from a plastic material, metal, or a combination thereof.

Clause 15. A core collector for collecting aeration cores lifted from a ground surface by a ground aerator machine, the core collector comprising:
a skid plate having a bottom surface configured to contact the ground surface and a top surface opposite the bottom surface; and
a plurality of openings in the skid plate extending between the top surface and the bottom surface at a proximal end of the skid plate,
wherein aeration cores extracted from the ground surface are deposited directly onto the top surface of the skid plate.

Clause 16. A ground aerator machine for extracting aeration cores from a ground surface, the ground aerator machine comprising:
a frame movably supported on two or more wheels;
a motor supported on the frame;
a coring drive mechanism operatively connected to the motor;
a plurality of extraction tines reciprocally driven by the coring drive mechanism into and out of the ground surface; and
a core collector connected to the frame, the core collector comprising:
a skid plate having a bottom surface configured to contact the ground surface and a top surface opposite the bottom surface; and
a plurality of openings in the skid plate extending between the top surface and the bottom surface at a proximal end of the skid plate, the plurality of openings are spaced apart from each other based on a spacing of extraction tines,
wherein the aeration cores extracted from the ground surface are deposited directly onto the top surface of the skid plate.

Clause 17. The ground aerator machine of clause 16, further comprising at least one core clearing member mounted on at least one of the frame and the core collector, wherein the at least one core clearing member is configured to clear the aeration cores from the proximal end of the skid plate toward a distal end of the skid plate.

Clause 18. The ground aerator machine of clause 16 or clause 17, further comprising a housing engaged with the skid plate.

Clause 19. The ground aerator machine of clause 18, wherein the housing comprises an enclosure that at least partially encloses the skid plate.

Clause 20. The ground aerator machine of any of clauses 16-19, wherein the coring drive mechanism is operatively connected to the motor by a driveshaft or a belt.

These and other features and characteristics of the improved core collector for use with a ground aerator, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

DETAILED DESCRIPTION OF THE INVENTION

Figure 1A:
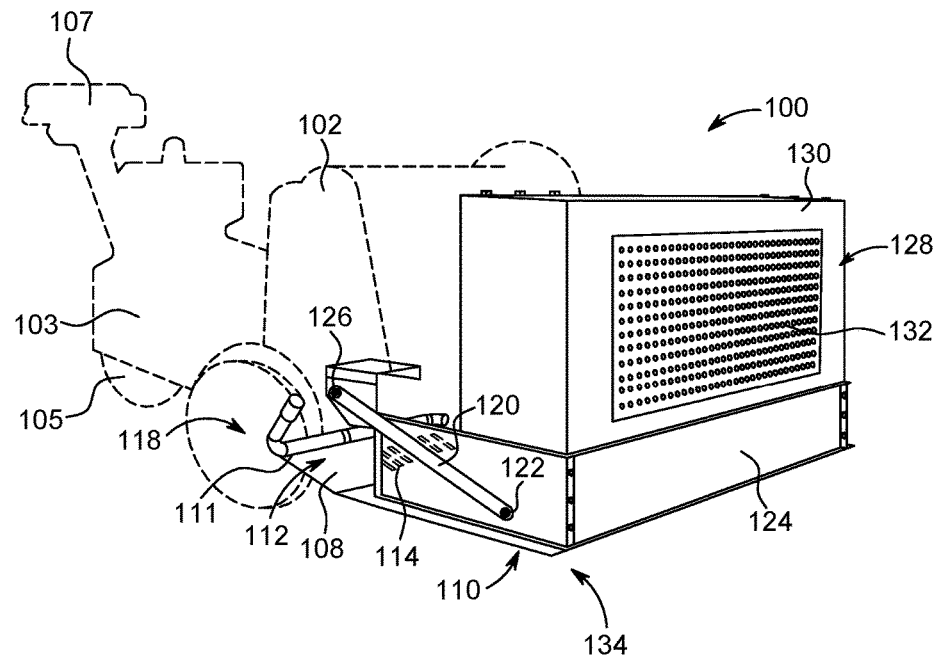
FIG. 1A is a perspective view of a core collector in accordance with one preferred and non-limiting aspect or embodiment of the present disclosure, shown in combination with a ground aerator machine.

As used in the specification and the claims, the singular form of "a", "an", and "the" include plural referents unless the context clearly dictates otherwise.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. It is to be understood, however, that the disclosure may assume alternative variations and step sequences, except where expressly specified to the contrary. It is also to be understood that the specific devices and processes illustrated in the attached drawings, and described in the following specification, are simply exemplary aspects of the disclosure. Hence, specific dimensions and other physical characteristics related to the aspects disclosed herein are not to be considered as limiting.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, "aeration core", "core", or "plug" refers to a portion of a top surface layer of the ground that is extracted using a ground aerator machine.

Referring to the drawings in which like reference characters refer to like parts throughout the several views thereof, the present disclosure is generally directed to a core collector for collecting aeration cores extracted from a ground surface during a ground aeration process. With initial reference to FIGS. 1A-1B, a core collector 100 is configured for use with a ground aerator machine 102. In various applications, the core collector 100 may be attached removably or non-removably to the ground aerator machine 102. The ground aerator machine 102 is configured for extracting aeration cores from the ground surface.

Figure 2:
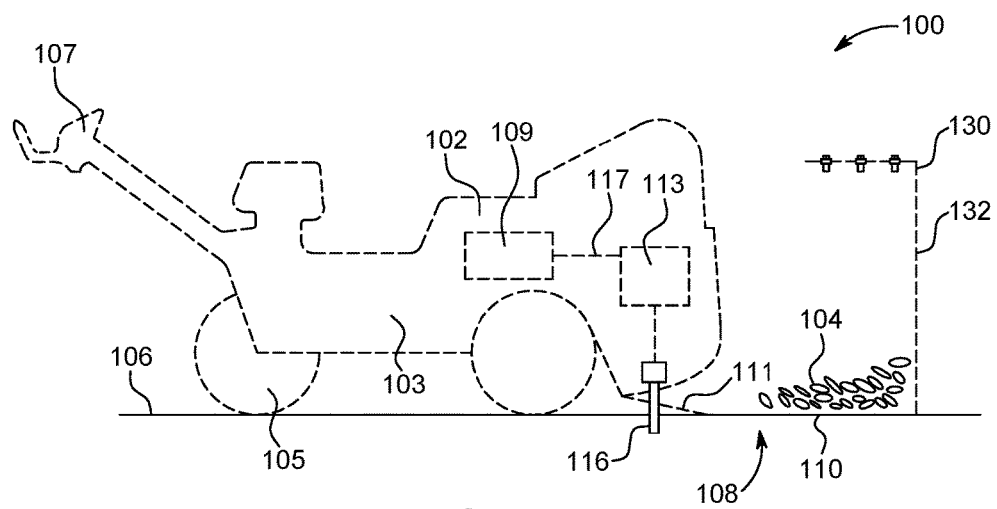
FIG. 2 is a side view of the core collector and the ground aerator machine shown in FIG. 1A.

With reference to FIG. 2, the ground aerator machine 102 may have a frame 103 movably supported on two or more wheels 105. The ground aerator machine 102 may have a control panel 107 providing the operator with various knobs, levers, keys, buttons, or other actuation devices for controlling operation of the ground aerator machine 102 and/or the core collector 100. In some examples, the ground aerator machine 102 has a motor 109, such as an internal combustion engine. The motor 109 provides motive power for moving the ground aerator machine 102 and for operating the plurality of tines for extracting aeration cores from the ground surface, as described herein. The motor 109 may be operatively connected to a coring drive mechanism 113 by a driveshaft 117 or a bell (not shown). The coring drive mechanism 113 is configured to reciprocally drive one or more extraction tines 116 into and out of the ground surface 106, with each extraction tine 116 extracting an aeration core 104 as it is withdrawn from the ground surface 106.

In some aspects, the core collector 100 may be removably attached to a walk-behind type of a ground aerator machine 102. In other aspects, the core collector 100 may be removably attached to a pull-behind type of a ground aerator machine 102 that may be pulled by a tractor or other machine. In all aspects, the core collector 100 is configured for collecting aeration cores 104 (shown in FIG. 2) extracted by the ground aerator machine 102 from the ground surface 106 (shown in FIG. 2). The cores 104 are collected by the core collector 100 in such a manner that, once extracted from the ground surface 106, the cores 104 are deposited directly onto the core collector 100 without being first deposited onto the ground surface 106. In this manner, the core collector 100 reduces or eliminates the debris that may be left behind on the ground surface 106 after the cores 104 have been extracted from the ground surface 106. By directly depositing the cores 104 onto the core collector 100 instead of the ground surface 106, the core collector 100 eliminates the need for sweeping the extracted cores 104 that are left behind the ground aerator machine 102, as is typically done with existing ground aeration methods.

With reference to FIGS. 1A-2, the core collector 100 has a skid plate 108 that is configured to be pulled or pushed along the ground surface 106 by the ground aerator machine 102. The skid plate 108 may be configured as a substantially rectangular sheet having a bottom surface 110 configured to contact the ground surface 106 and a top surface 112 opposite the bottom surface 110. The bottom surface 110 is substantially flat such that it can uniformly contact the ground surface 106. In some examples, at least a portion of the bottom surface 110 may be angled relative to the remainder of the bottom surface 110 to allow the skid plate 108 to slide over various bumps on the ground surface 106 without getting stuck on the bumps. Desirably, an angled portion 111 of the bottom surface 110 may be provided at a proximal end 118 of the core collector 100 closest to the ground aerator machine 102.

The skid plate 108 has a plurality of openings 114 extending from the top surface 112 to the bottom surface 110 through the thickness of the skid plate 108. In some examples, the openings 114 may be provided at the proximal end 118 of the core collector 100. The plurality of openings 114 are spaced apart from each other based on a spacing of the extraction tines 116 (shown in FIG. 2) of the ground aerator machine 102. Each opening 114 may have a rectangular or oval form and is shaped to receive at least one extraction tine 116 during operation of the ground aerator machine 102. In use, the extraction tines 116 extend through the openings 114 and into the ground surface 106 to extract the cores 104 and deposit the extracted cores 104 directly onto the skid plate 108. The plurality of openings 114 are positioned at the proximal end 118 of the skid plate 108 and extend in a lateral direction across at least a portion of the lateral width of the skid plate 108.

The skid plate 108 may be formed from a plastic material, such as High Density Polyethylene (HDPE). In other aspects, the skid plate 108 may be formed from a metal material. In further aspects, the skid plate 108 may be made from a combination of two or more materials, such as from a combination of HDPE and metal. Desirably, the skid plate 108 is made from a material configured to support a load of extracted cores 104 on the top surface 112 thereof. The skid plate 108 may be made from a material that is substantially rigid, or a material that is flexible as to at least partially conform to the contour of the ground surface 106.

With continued reference to FIGS. 1-2, the core collector 100 is connected to the ground aerator machine 102 by a linkage mechanism 120 (shown in FIG. 1). The linkage mechanism 120 has a first end 122 connected to the core collector 100, such as a frame 124 associated with the skid plate 108. A second end 126 of the linkage mechanism 120 is connected to at least a portion of the ground aerator machine 102. The linkage mechanism 120 may be configured to allow the core collector 100, in particular the frame 124, to be raised and lowered relative to the skid plate 108. In a raised position, the frame 124 is elevated from the skid plate 108 to allow for emptying of extracted cores 104 from the skid plate 108. In a lowered position, the frame 120 is in contact with the skid plate 108, or is positioned relative to the skid plate 108 as to allow the cores 104 to be collected on the top surface 112 of the skid plate 108 without allowing the cores 104 to fall off of the skid plate 108.

Figure 3:
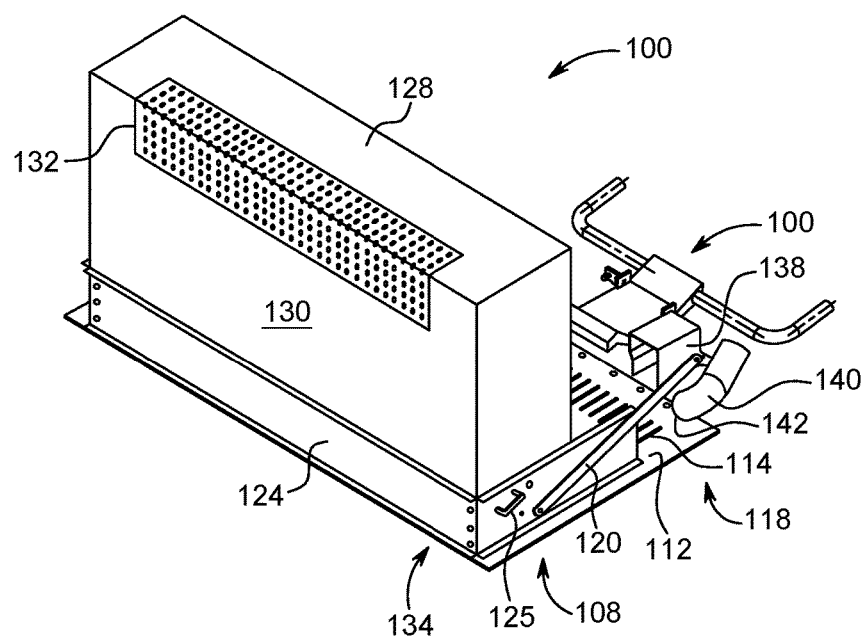
FIG. 3 is a perspective view of a core collector with another preferred and non-limiting aspect or embodiment of the present disclosure.
Figure 4:
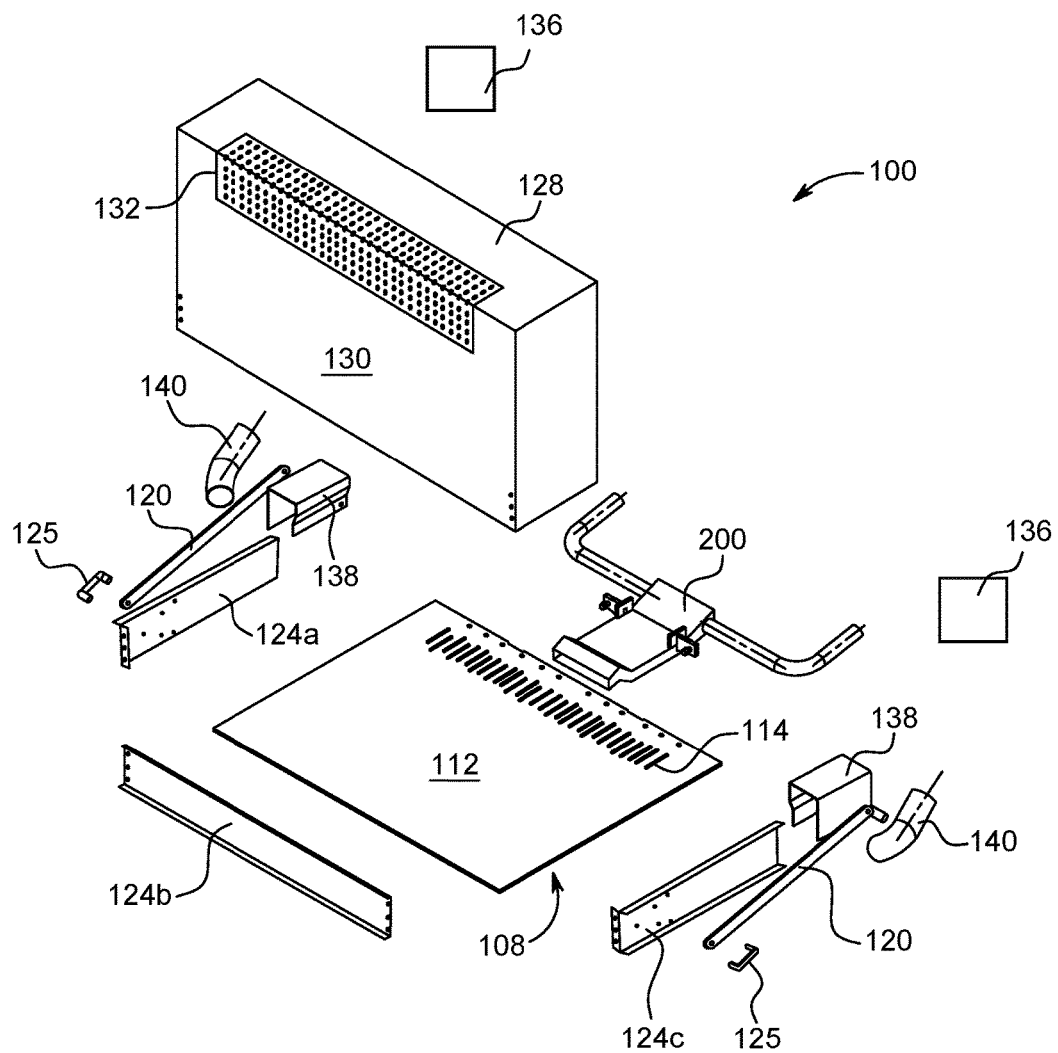
FIG. 4 is an exploded view of the core collector shown in FIG. 3.
Figure 5:
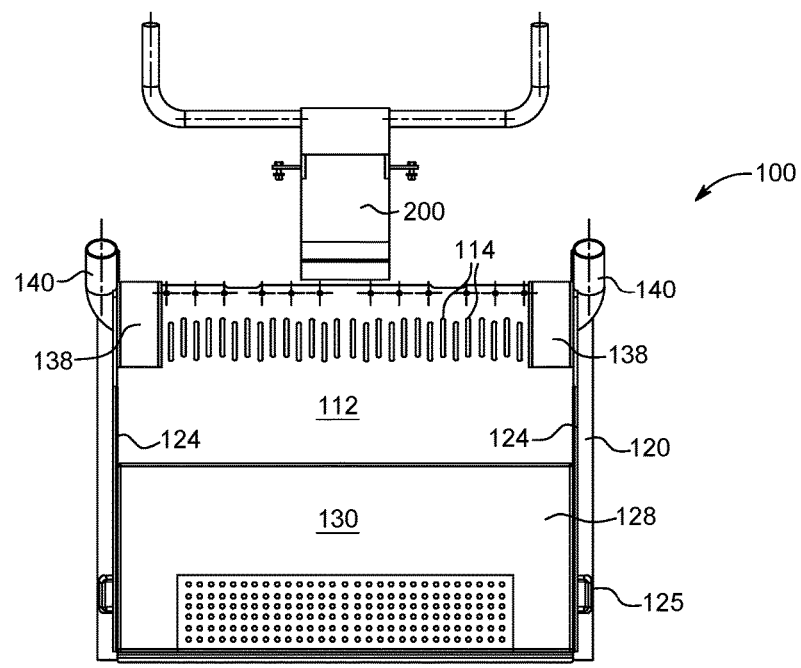
FIG. 5 is a top view of the core collector shown in FIG. 3.

With reference to FIGS. 3-4, the core collector 100 is shown removed from the ground aerator machine 102 in accordance with another preferred and non-limiting aspect or embodiment. The core collector 100 includes the frame 124 that extends at least around a portion of an outer perimeter of the skid plate 108. The frame 124 may be removably connected to the skid plate 108. A handle 125 may be provided for raising and lowering the frame 124 relative to the skid plate 108. In some aspects, the frame 124 may have a plurality of individual frame members 124a-124c (FIG. 4) that are connected to one another and/or to the skid plate 108. The plurality of individual frame members 124a-124c may be removably or non-removably connected to one another. In some examples, the plurality of individual frame members 124a-124c are monolithically formed as a single, unitary structure. The frame 124 may be connected to or engaged with the skid plate 108 by a releasable mechanical connection. In some examples, the frame 124 may engage an upper surface of the skid plate 108. The linkage mechanism 120 may be connected to at least a portion of the frame 124 for raising or lowering the frame 124 relative to the skid plate 108.

With continued reference to FIGS. 3-4, the core collector 100 further has a housing 128 connected to the skid plate 108 and/or the frame 124. The housing 128 defines an enclosure 130 that at least partially encloses the skid plate 108. In some examples, the enclosure 130 has one or more vent openings 132 for venting the interior of the enclosure 130. The enclosure 130 may be partially or fully enclosed. In some aspects, the housing 128 is positioned at a distal end 134 of the skid plate 108 opposite the plurality of openings 114. In some aspects, the housing 128 may be connected to the skid plate 108 such that the housing 128 sits on the top surface 112 of the skid plate 108.

Figure 1B:
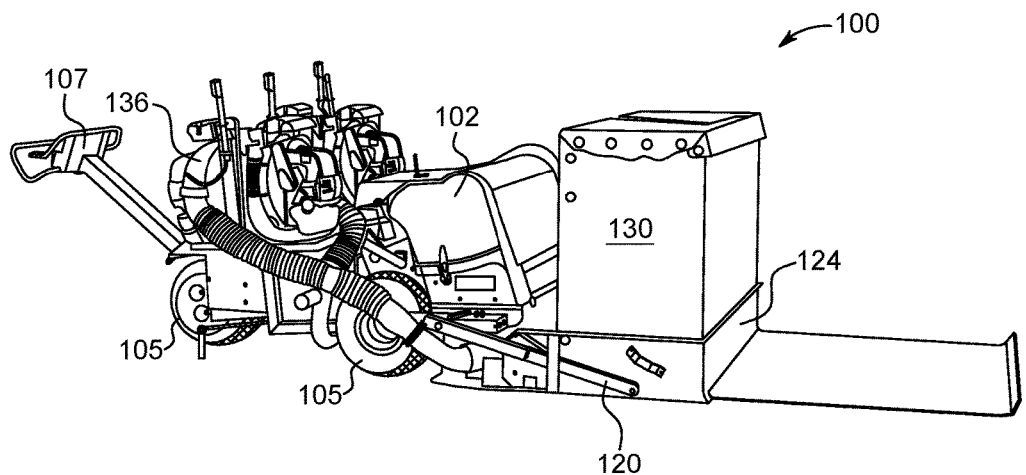
FIG. 1B is a perspective view of a core collector in accordance with another preferred and non-limiting aspect or embodiment of the present disclosure, shown in combination with a ground aerator machine.
Figure 6:
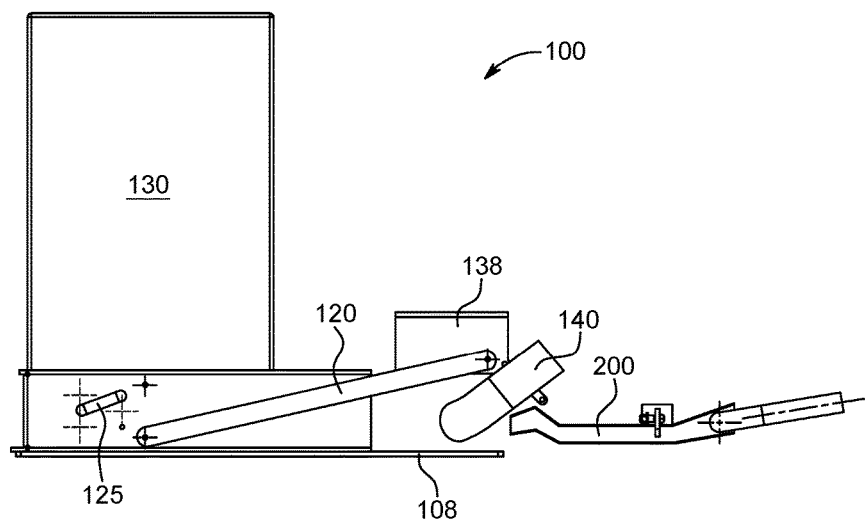
FIG. 6 is side view of the core collector shown in FIG. 3.

The core collector 100 further has at least one core clearing member 136 (shown in FIG. 1B and FIG. 4). In some aspects, the at least one core clearing member 136 is a blower, such as a gas- or an electrically-powered blower in other examples, the at least one core clearing member 136 is a pair of blowers provided on opposing lateral sides of the skid plate 108. In further examples, such as shown in 1B, a pair of blowers 136 may be provided on each lateral side of the ground aerator machine 102, wherein some or all of the blowers 136 are mounted directly the frame 124 of the ground aerator machine 102. In some examples, each core clearing member 136 may be secured to a bracket 138. The bracket 138 may be connected to at least a portion of the core collector 100 and/or the ground aerator machine 102. One or more pipes 140 may be connected to the core clearing member 136 to direct forced air generated by the core clearing member 136 toward at least one of the plurality of openings 114. In this manner, the extracted cores 104 may be blown from the proximal end 118 of the skid plate 108 toward the distal end 134 of the skid plate 108 as the cores 104 are extracted from the ground surface 106 (shown in FIG. 2). The one or more pipes 140 may have one or more openings 142 to direct the forced air and blow the extracted cores 104 toward the distal end 134 of the skid plate 108. At least a portion of the pipe 140 may extend along the proximal end 118 of the skid plate 108 (see FIG. 6). In some aspects, the core clearing member 136 may be one or more manually operated blowers handled by operators to blow extracted cores toward the distal end 134 of the skid plate 108. In addition to the one or more pipes 140, the core collector 100 may have a manifold assembly 200 configured for directing forced air from the at least one core clearing member 136. Features and functionality of the manifold assembly 200 is described herein with reference to FIG. 7.

Figure 7:
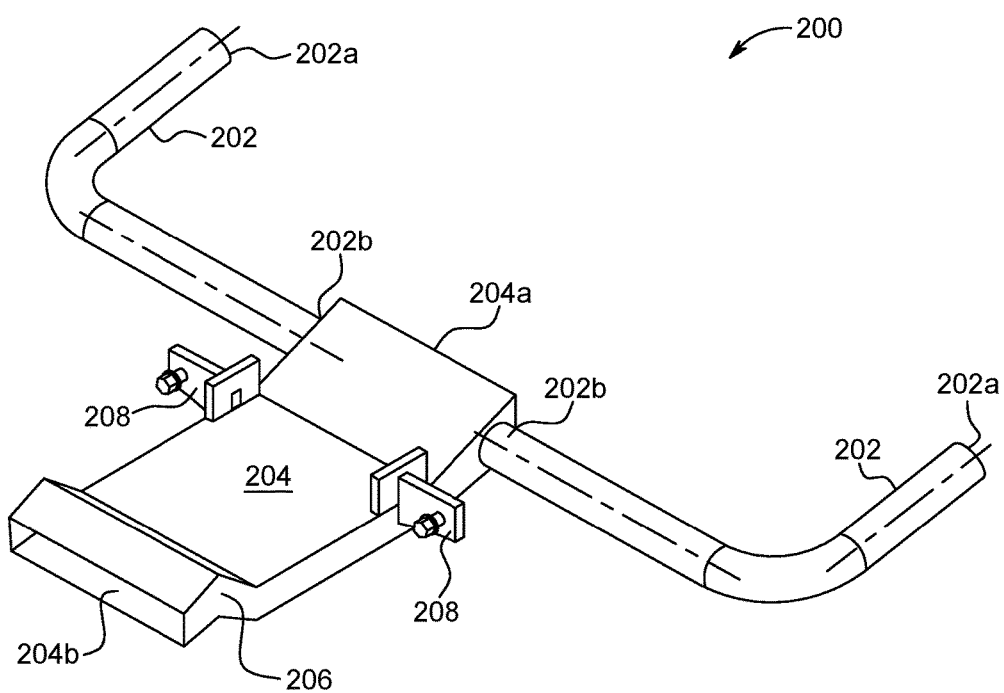
FIG. 7 is a perspective view of a manifold for use with the core collector shown in FIG. 3.

With reference to FIG. 7, the core collector 100 may have a manifold assembly 200 configured for directing forced air from the at least one core clearing member 136. The manifold assembly 200 is configured for receiving forced air from the at least one core clearing member 136 and directing the forced air along the top surface of the skid plate 108 to clear the extracted cores 104 toward the distal end 138 of the skid plate 108 (shown in FIG. 1A). In some examples, the manifold assembly 200 has one or more inlet pipes 202 having a first end 202a configured for connecting to the core clearing member 136 or to piping associated with the core clearing member 136. A second end 202b of each inlet pipe 202 is connected to a manifold collector 204. In some examples, the manifold collector 204 may have a box like shape with an inlet end 204a and an outlet end 204b. Forced air entering from the one or more inlet pipes 202 at the inlet end 204a of the manifold collector 204 is directed to an outlet end 204b of the manifold collector 204 such that the forced air can be blown across the upper surface of the skid plate 108. The outlet end 204b may be shaped to direct the forced air evenly across at least a portion of the skid plate 108. In some examples, the outlet end 204b of the manifold collector 204 may have a raised portion 206 such that the forced air is blow in a downward direction toward the upper surface of the skid plate 108. One or more mounting tabs 208 may be provided on at least a portion of the manifold assembly 200, such as at least a portion of the manifold collector 204, for mounting the manifold assembly to the core collector 100 and/or the ground aerator machine 102. The manifold assembly 200 may work in combination with the one or more pipes 140 to blow the extracted cores toward the distal end of the skid plate 108.

Having described the structure of the core collector 100, the method of operation of the core collector 100 for collecting extracted cores 104 will now be described. In operation, the core collector 100 is connected to the ground aerator machine 102. In some aspects, the core collector 100 may be formed integrally with the ground aerator machine 102. Prior to use, the core collector 100 may be in a raised position, where the skid plate 108 is lifted off of the ground surface 106 to facilitate transportation to an area that will be aerated. The core collector 100 may then be lowered by lowering the skid plate 108 into contact with the ground surface 106. The ground aerator machine 102 may be operated in a known manner to extract cores 104 from the ground surface 106. As the cores 104 are extracted by the tines 116 of the ground aerator machine 102, the cores 104 are pulled through at least one of the plurality of openings 114 and deposited directly onto the top surface 112 at the proximal end 118 of the skid plate 108. The extracted cores 104 are then blown across the top surface 112 of the skid plate 108 toward the distal end 134 so that the extracted cores 104 do not interfere with extraction of new cores 104. When the skid plate 108 is sufficiently covered with extracted cores 104, the skid plate 108 may be emptied to dispose of the extracted cores 104 by lifting the frame 124 and/or the housing 128.

Although the disclosure has been described in detail for the purpose of illustration based on what is currently considered to be the most practical and preferred aspects, it is to be understood that such detail is solely for that purpose and that the disclosure is not limited to the disclosed aspects, but, on the contrary, is intended to cover modifications and equivalent arrangements. For example, it is to be understood that the present disclosure contemplates that, to the extent possible, one or more features of any aspect can be combined with one or more features of any other aspect.

What is claimed is:

1. A core collector for collecting aeration cores lifted from a ground surface by a ground aerator machine, the core collector comprising:
    a single skid plate having a bottom surface opposite the ground surface and in direct contact with the ground surface, a top surface opposite the bottom surface, a proximal end closest to the ground aerator machine and a distal end opposite the proximal end;
    a plurality of openings in the skid plate extending between the top surface and the bottom surface at the proximal end of the skid plate;
    at least a pair of blowers provided on opposite sides of the skid plate; and
    one or more pipes having a first end connected to each of the blowers and a second end positioned over at least one of the plurality of openings,
    wherein the aeration cores that are extracted from the ground surface are deposited directly onto the top surface at the proximal end of the skid plate, and
    wherein the blowers are configured to clear the aeration cores from the proximal end of the skid plate toward the distal end of the skid plate by directing forced air from each of the blowers to at least one of the plurality of openings on the skid plate through the one or more pipes.

2. The core collector of claim 1, further comprising a housing engaged with the skid plate.

3. The core collector of claim 2, wherein the housing comprises an enclosure that at least partially encloses the skid plate.

4. The core collector of claim 3, wherein the enclosure has one or more vent openings.

5. The core collector of claim 1, further comprising a linkage mechanism for raising or lowering the housing relative to the skid plate.

6. The core collector of claim 5, wherein the linkage mechanism is configured for connecting the core collector to the ground aerator machine.

7. The core collector of claim 1, wherein the plurality of openings are spaced apart from each other based on a spacing of extraction tines of the ground aerator machine.

8. The core collector of claim 1, wherein the skid plate has an angled portion at the proximal end.

9. The core collector of claim 1, wherein the skid plate is made from a plastic material, metal, or a combination thereof.

10. The core collector of claim 1, wherein the bottom surface of the skid plate is configured to be pulled or pushed along the ground surface.

11. A ground aerator machine for extracting aeration cores from a ground surface, the ground aerator machine comprising:
    a frame movably supported on two or more wheels;
    a motor supported on the frame;
    a coring drive mechanism operatively connected to the motor;
    a plurality of extraction tines reciprocally driven by the coring drive mechanism into and out of the ground surface; and
    a core collector connected to the frame, the core collector comprising:
        a single skid plate having a bottom surface configured to directly contact the ground surface, a top surface opposite the bottom surface, a proximal end closest to the ground aerator machine and a distal end opposite the proximal end;
        a plurality of openings in the skid plate extending between the top surface and the bottom surface at the proximal end of the skid plate, the plurality of openings are spaced apart from each other based on a spacing of extraction tines;
        at least a pair of blowers provided on opposite sides of the skid plate; and
        one or more pipes having a first end connected to each of the blowers and a second end positioned over at least one of the plurality of openings,
    wherein the aeration cores extracted from the ground surface are deposited directly onto the top surface at the proximal end of the skid plate, and
    wherein the blowers are configured to clear the aeration cores from the proximal end of the skid plate toward the distal end of the skid plate by directing forced air from each of the blowers to at least one of the plurality of openings on the skid plate through the one or more pipes.

12. The ground aerator machine of claim 11, further comprising a housing engaged with the skid plate.

13. The ground aerator machine of claim 12, wherein the housing comprises an enclosure that at least partially encloses the skid plate.

14. The ground aerator machine of claim 11, wherein the coring drive mechanism is operatively connected to the motor by a driveshaft or a belt.

15. The ground aerator machine of claim 11, wherein the bottom surface of the skid plate is configured to be pulled or pushed along the ground surface.

* * * * *